(12) United States Patent
Shah et al.

(10) Patent No.: US 11,120,137 B2
(45) Date of Patent: Sep. 14, 2021

(54) SECURE TRANSFER OF REGISTERED NETWORK ACCESS DEVICES

(71) Applicant: NETGEAR, INC., San Jose, CA (US)

(72) Inventors: Mihir Dushyantbhai Shah, San Jose, CA (US); Tejas Pankajkumar Shah, San Jose, CA (US); Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 328 days.

(21) Appl. No.: 16/236,989

(22) Filed: Dec. 31, 2018

(65) Prior Publication Data

US 2019/0386977 A1   Dec. 19, 2019

Related U.S. Application Data

(60) Provisional application No. 62/687,142, filed on Jun. 19, 2018.

(51) Int. Cl.
*G06F 21/57* (2013.01)
*G06F 21/44* (2013.01)
(Continued)

(52) U.S. Cl.
CPC ............. *G06F 21/575* (2013.01); *G06F 8/65* (2013.01); *G06F 9/4416* (2013.01); *G06F 21/44* (2013.01); *G06F 21/572* (2013.01); *H04L 9/3268* (2013.01); *H04L 41/0816* (2013.01); *H04L 63/083* (2013.01); *H04L 63/0823* (2013.01); *H04L 63/107* (2013.01); *H04L 67/10* (2013.01); *H04W 4/80* (2018.02); *H04W 12/086* (2021.01);
(Continued)

(58) Field of Classification Search
CPC ........ G06F 21/575; G06F 8/65; G06F 9/4416; G06F 21/44; G06F 21/572; H04W 4/80; H04W 12/086; H04W 12/30; H04W 60/00; H04L 9/3268; H04L 41/0816; H04L 63/0823; H04L 63/083; H04L 63/107; H04L 67/10
See application file for complete search history.

(56) References Cited

U.S. PATENT DOCUMENTS 6,463,535 B1   10/2002   Drews
8,793,774 B1   7/2014   Kumar et al.
(Continued)

*Primary Examiner* — Oleg Korsak
(74) *Attorney, Agent, or Firm* — Perkins Coie LLP

(57) ABSTRACT

The disclosed embodiments include a method performed by a cloud system for changing a registration of a network access device. The method includes initiating a change of a registration of a network access device. The registration is stored at a cloud system and indicates ownership of the network access device by a first user. The method further includes receiving an authorization from the first user to dissociate the ownership of the network access device by the first user, and receiving an indication of a physical reset occurring locally at the network access device. The physical reset allows the first user to dissociate the ownership of the network access device. The method further includes, upon receiving both the authorization by the first user and the indication of the physical reset, releasing the ownership by the first user of the network access device at the cloud system.

25 Claims, 6 Drawing Sheets

(51) Int. Cl.
  *H04L 9/32* (2006.01)
  *G06F 8/65* (2018.01)
  *H04W 4/80* (2018.01)
  *H04L 12/24* (2006.01)
  *H04L 29/06* (2006.01)
  *H04L 29/08* (2006.01)
  *H04W 60/00* (2009.01)
  *G06F 9/4401* (2018.01)
  *H04W 12/30* (2021.01)
  *H04W 12/086* (2021.01)

(52) U.S. Cl.
  CPC ............ *H04W 12/30* (2021.01); *H04W 60/00* (2013.01); *G06F 9/4401* (2013.01); *G06F 2221/033* (2013.01); *G06F 2221/2111* (2013.01)

(56) References Cited

U.S. PATENT DOCUMENTS

| | | |
|---|---|---|
| 10,180,845 B1 | 1/2019 | Nunes |
| 2003/0188161 A1 | 10/2003 | Ndiaye |
| 2005/0071675 A1 | 3/2005 | Chu et al. |
| 2005/0071677 A1 | 3/2005 | Khanna et al. |
| 2005/0091496 A1 | 4/2005 | Hyser |
| 2006/0271782 A1 | 11/2006 | Ishiyama et al. |
| 2008/0046548 A1 | 2/2008 | Doran et al. |
| 2008/0209515 A1 | 8/2008 | Ibrahim et al. |
| 2010/0082987 A1 | 4/2010 | Thom et al. |
| 2010/0185845 A1 | 7/2010 | Takayama et al. |
| 2011/0066838 A1 | 3/2011 | Takayama et al. |
| 2014/0181498 A1 | 6/2014 | Rhee et al. |
| 2014/0181517 A1 | 6/2014 | Alaranta et al. |
| 2014/0372743 A1* | 12/2014 | Rogers ............... H04W 12/126 713/2 |
| 2015/0074764 A1* | 3/2015 | Stern ................ H04L 63/06 726/4 |
| 2016/0087933 A1* | 3/2016 | Johnson .............. H04L 67/34 709/245 |
| 2017/0048070 A1 | 2/2017 | Gulati et al. |
| 2017/0272316 A1* | 9/2017 | Johnson ............. G06Q 10/103 |
| 2018/0123804 A1* | 5/2018 | Smith ................ H04L 9/3213 |
| 2018/0165480 A1 | 6/2018 | Raju |
| 2018/0191695 A1 | 7/2018 | Lindemann |
| 2018/0204007 A1 | 7/2018 | Rangayyan |
| 2019/0007204 A1 | 1/2019 | Field et al. |
| 2019/0158353 A1* | 5/2019 | Johnson ............. H04L 61/2514 |
| 2019/0384916 A1 | 12/2019 | Shah et al. |
| 2019/0384917 A1 | 12/2019 | Shah et al. |
| 2019/0386977 A1 | 12/2019 | Shah et al. |
| 2020/0244297 A1* | 7/2020 | Zalewski ............ H04W 76/14 |
| 2020/0403808 A1* | 12/2020 | Smith ................ H04L 9/3234 |

* cited by examiner

SECURE TRANSFER OF REGISTERED NETWORK ACCESS DEVICES

CROSS-REFERENCE TO RELATED APPLICATION

This application claims priority to U.S. provisional patent application Ser. No. 62/687,142 filed Jun. 19, 2018 and titled "Security Mechanisms for Networking Devices and Associated Techniques," which is incorporated herein in its entirety by this reference thereto.

TECHNICAL FIELD

The disclosed teachings generally relate to techniques for securely changing a registration of a network access device. The disclosed teachings more particularly relate to techniques for securely transferring ownership, control, or a configuration of a network access device registered with a cloud security system.

BACKGROUND

A hardware restriction is content protection enforced by electronic components. A hardware restriction scheme may complement a digital rights management (DRM) system implemented in software. An example of a hardware restriction is a personal computer (PC) that implements "Secure Boot," which refers to a security standard developed by members of the PC industry to ensure that an electronic device boots using only software that is trusted by the original equipment manufacturer (OEM). Often considered a key feature of the unified extensible firmware interface (UEFI), Secure Boot defines an interface between an operating system and firmware. When an electronic device starts, firmware can check the signature of each piece of boot-related software, including UEFI firmware drivers (also referred to as "Option Read-Only Memories" or "Option ROMs"), EFI applications, and an operating system. If these signatures are valid, then the electronic device will boot and the firmware of the electronic device will grant control to the operating system.

When enabled and fully configured, Secure Boot helps the electronic device resist unauthorized access by malicious actors or software. For example, Secure Boot can detect tampering with boot loaders, key operating system files, and unauthorized Option ROMs by validating their digital signatures. Detections can be blocked from running before malware can infect the electronic device.

Unlike other electronic devices, network access devices such as a router, switch, modem, or access point are interchangeable devices that can be readily taken from one network, reset, and installed for use in another network. Hence, network access devices remain vulnerable to unauthorized access and lack secure management tools that enable transfer of a network access device from one user or device to another user or device.

SUMMARY

The disclosed embodiments include at least one method performed by a cloud system for changing a registration of a network access device. The method includes initiating a change of a registration of a network access device. The registration is stored at a cloud system and indicates ownership of the network access device by a first user. The method further includes receiving an authorization from the first user to dissociate the ownership of the network access device by the first user, and receiving an indication of a physical reset occurring locally at the network access device. The physical reset allows the first user to dissociate the ownership of the network access device. The method further includes, upon receiving both the authorization by the first user and the indication of the physical reset, releasing the ownership by the first user of the network access device at the cloud system.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
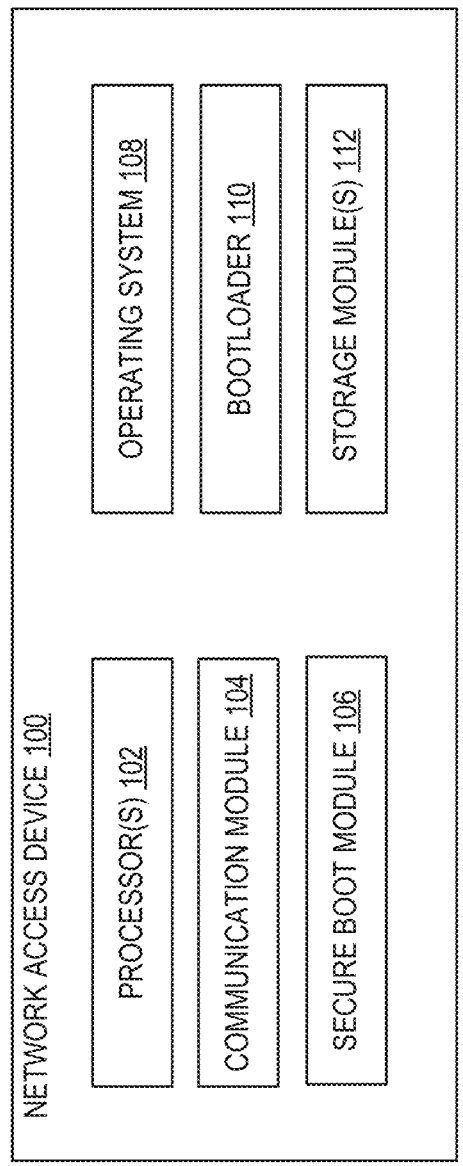
FIG. 1 is a block diagram that illustrates an architecture of a network access device according to some embodiments of the present disclosure.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

As used herein, a "network access device" (NAD) or "networking device" may refer to equipment required to make a connection to, for example, a wide area network (WAN) from a local area network (LAN). Examples of a network access device include a router, switch, modem, or access point. In contrast, a "network device" may refer to devices that can form a connection in a network such as end-user devices or other network access devices.

An example of a hardware restriction is Secure Boot, which is initiated during a startup process of a personal computer (PC) executing an operating system (OS). Secure Boot works similar to a security gate. For example, a code with valid credentials is permitted through the security gate and thus allowed to execute. Likewise, Secure Boot will block any codes with bad credentials or no credentials. Specifically, when PC starts, it first finds the OS bootloader. PCs without Secure Boot will simply run whatever bootloader is on the hard drive. In such instances, there is no way for the PC to tell whether it is a trusted OS or a rootkit.

Conversely, when a PC equipped with unified extensible firmware Interface (UEFI) starts, the PC initially verifies that the firmware is digitally signed, thereby reducing the risk of firmware rootkits. If Secure Boot is enabled, the firmware will examine the bootloader's digital signature to verify that it has not been modified. If the bootloader is fully intact, the firmware will start the bootloader if either the bootloader was signed using a trusted certificate or the user has manually approved the bootloader's digital signature. Such a process is only possible on PCs with a UEFI and a trusted platform module (TPM) chip.

Introduced here, therefore, are mechanisms like secure boot but that are employed by different types of electronic devices other than PCs. Examples of the electronic devices include routers, modems, switches, and access points. Collectively, these types of electronic devices may be referred to as "network access devices." When employed by a network access device, the disclosed security mechanisms can serve as an additional safeguard on top of those employed by the electronic devices (e.g., PCs and smartphones) that are communicatively coupled to the network access device.

Network Access Device

FIG. 1 is a block diagram illustrating the architecture of a network access device 100 that facilitates establishing and maintaining connections between network devices (e.g., PCs, smartphones, wearable items, other network access devices) and a network. The network access device 100 may be, for example, a router, modem, switch, or access point. Some embodiments are described in the context of a router for purpose of illustration only. Those skilled in the art will recognize that similar technology may be used in conjunction with other types of network access devices, other network devices, or a broad variety of electronic devices.

The network access device 100 can include one or more processors 102, a communication module 104, a secure boot module 106, an operating system 108, a bootloader 110, and one or more storage modules 112.

The processor(s) 102 can execute instructions stored in the storage module(s) 112, which can be any device or mechanism capable of storing information. In some embodiments a single storage module includes multiple computer programs for performing different operations (e.g., establishing a communication channel with an electronic device, examining data packets within received traffic), while in other embodiments each computer program is hosted within a separate storage module.

The communication module 104 can manage communications between various components of the network access device 100. The communication module 104 can also manage communications between the network access device 100 and another electronic device. For example, the communication module 104 may facilitate communication with a smartphone, tablet computer, or wearable device seeking to establish a connection with a network to which the network access device 100 is connected. As another example, the communication module 104 may facilitate direct or indirect communication with a computer server responsible for supporting the network. Generally, the communication module 104 communicates with other electronic device(s) by transmitting data via an antenna. In some embodiments, the network access device 100 includes multiple antennas designed for communicating in accordance with various protocols (e.g., Wi-Fi, BLUETOOTH, near-field communication).

As further described herein, the secure boot module 106 can be configured to, upon startup, verify that firmware residing on the network access device 100 has been digitally signed. For example, the secure boot module 106 may examine the digital signature of the bootloader 110 to verify that it has not been modified. If the bootloader 110 is fully intact, the secure boot module 106 may permit the bootloader 110 to initiate the operating system 108.

Embodiments of the network access device 100 may include some or all of these components, as well as other components not shown herein for brevity.

Secure Boot Mechanisms

A network access device may employ different security technologies for reducing the risk of unauthorized access by, for example, malware. Generally, these security technologies can be attributed to three different layers.

At the hardware layer, a boot certificate (also referred to as a "birth certificate") can be "sewn" or "burned" into a network access device during a manufacturing process. Said another way, registration information can be embedded within a secure, chipset-level location known to the manufacturer. When the network access device initially comes online, the boot certificate may be requested by a network-accessible server system that is part of a cloud system (also referred to as a "cloud-based system"). The network-accessible server system can verify that the network access device was manufactured by a certain manufacturer based on the content of the boot certificate. Moreover, the boot certificate may need to be verified before communication between the network access device and the network-accessible server system is permitted.

At the firmware layer, to ensure that no one other than the manufacturer (or some other verified entity) can install firmware onto a network access device, the network access device may require that the firmware be digitally signed. Signing may be done through a computer program (also referred to as an "application") executing on, for example, a network-accessible server system. More specifically, the computer program may upload firmware to a network access device, sign the firmware, and then attach the firmware to a secure location (e.g., the same location as the boot certificate).

At the application layer, applications residing on a network access device can be read by, for example, a secure boot module. These applications can be developed by a manufacturer or a third party. While a user may be permitted to use/modify an application using an appropriate technology (e.g., an open source technology), the application may be prevented from being deployed until the secure boot module verifies that the application has been signed by the manufacturer.

Figure 2:
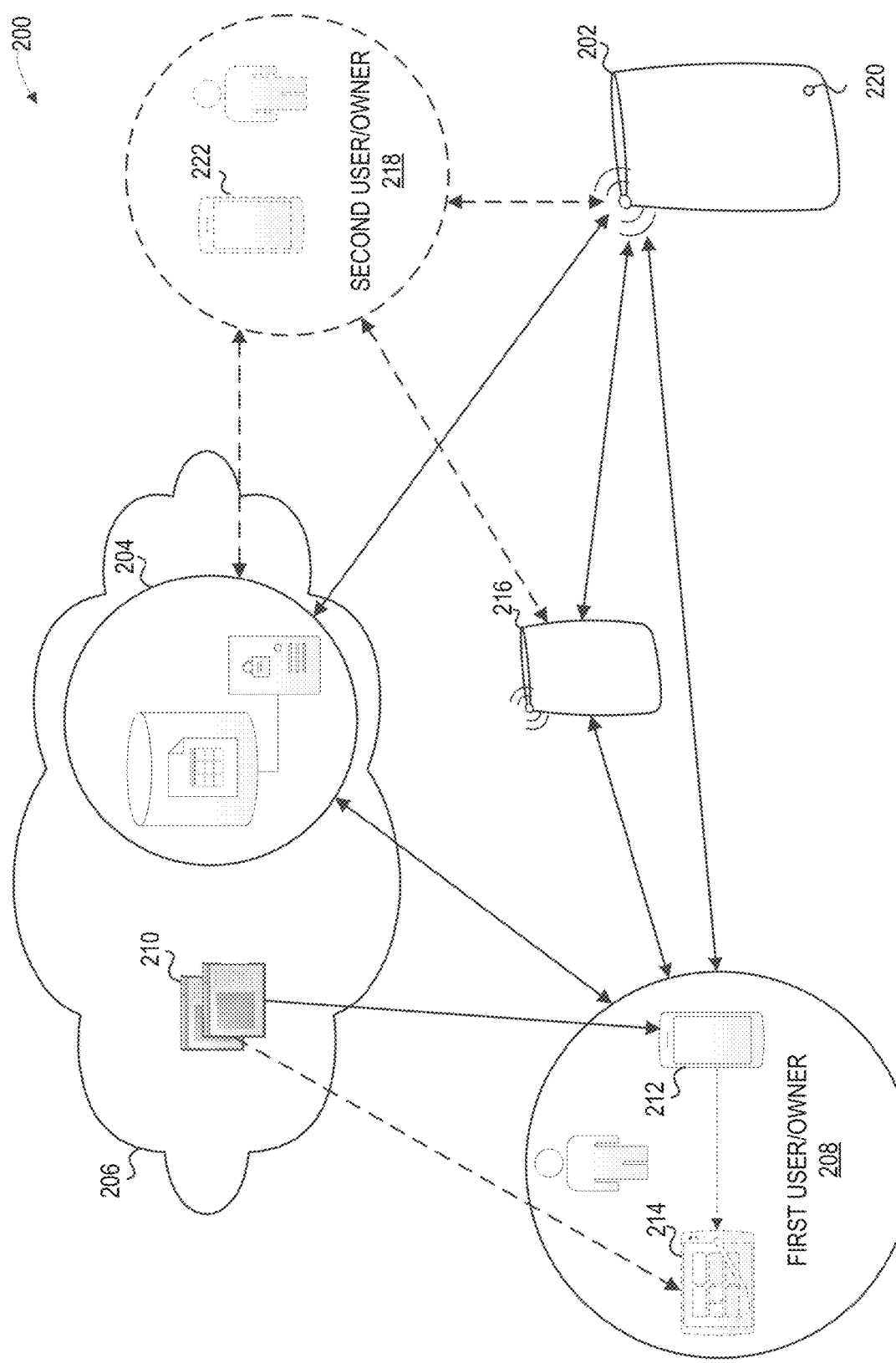
FIG. 2 is a block diagram that illustrates a network environment in which at least some aspects of the disclosed technology can be implemented.

FIG. 2 is a block diagram that illustrates a network environment 200 in which at least some aspects of the disclosed secure transfer technology can be implemented. The network environment 200 includes one or more interconnected networks such as, for example, private or public networks including personal area networks (PANs), local area networks (LANs), wide area networks (WANs) (e.g., the Internet), metropolitan area networks (MANs), and cellular networks. Each network includes one or more interconnected systems and/or electronic devices. Examples of electronic devices include a personal computer (PC), tablet computer, personal digital assistant (PDA), mobile phone, game console, music player, wearable electronic device (e.g., a watch or fitness accessory), network-connected ("smart") electronic device (e.g., a television or home assistant device), or virtual/augmented reality system (e.g., a head-mounted display). For example, a LAN may have several electronic devices that are interconnected therein and communicatively coupled to at least one electronic device on the Internet.

The network environment 200 includes a network access device 202 of a LAN (e.g., home network). An example of the network access device 202 is an ORBI® Wi-Fi router manufactured by NETGEAR®. Other examples of a network access device include a modem, router, access point, switch, or combinations thereof. The network access device 202 may route or forward data between a network that includes the network access device 202 and another network of the network environment 200. For example, if the network access device 202 of a home network receives data packet(s) from a public network that are destined for an electronic device of the home network, then the network access device 202 can forward the data packet(s) to the corresponding electronic device either directly or indirectly (e.g., via a satellite network access device). If the network access device 202 receives data packet(s) from the electronic device of the home network for the public network, then the network access device 202 can forward the data packet(s) to the public network for transmission downstream.

In the illustrated example, the first user 208 is associated with user devices including a mobile phone 212 and/or a tablet computer 214 on a local or home Wi-Fi network. A second user 218 is associated with another user device 222 (e.g., mobile phone), which can be associated with the home Wi-Fi network if authorized to do so. The mobile phone 212 and/or a tablet computer 214 of the Wi-Fi network may communicate with the network access device 202 by using a suitable wired and/or wireless communication protocol(s). In some embodiments, an electronic device (e.g., mobile phone 212) may also communicate with the network access device 202 via a short-range wireless communication protocol (e.g., BLUETOOTH®) or cellular protocol.

When the network access device 202 initially goes online, it can communicate to the network-accessible server system 204 of a cloud system 206. As noted above, the network-accessible server system 204 may verify the boot certificate before claiming the network access device 202. Once the network access device 202 has been claimed, an agent deployed on the network access device 202 may be permitted to communicate with the network-accessible server system 204 without restriction. For example, using the agent, the network access device 202 can register with the network-accessible server system 204 to indicate that it has been brought online.

Meanwhile, the first user 208 (e.g., current owner) may download a computer program (e.g., a mobile application 210) for execution on the user devices 212 or 214. The mobile application 210 is designed to control management of the network access device 202 exclusively by the user device running the mobile application 210 and a valid certificate that grants exclusive control to that user device. For example, the first user 208 may initially download the mobile application 210 onto the user device 212 via a cellular network (e.g., LTE or 4G), log into the installed mobile application using credentials associated with the network-accessible server system 204, activate the relevant certificate, and specify that the user would like to claim the network access device 202.

Upon discovering that the first user 208 has submitted a request to claim the network access device 202, a private key corresponding to a certificate residing on the network access device 202 can be transmitted to the network-accessible server system 204 over a Wi-Fi network. Such action allows the network-accessible server system 204 to verify physical ownership of the network access device 202 by the first user 208. In some embodiments, the mobile application 210 and the network access device 202 are mapped to each other to ensure that these objects are within a predetermined physical proximity during the registration process. Location may be estimated based on, for example, LAN or geo-location techniques (e.g., via geotagged IP addresses).

An online certificate can then be pushed onto the network access device 202. Until online certificate authentication occurs for a given user, the user may not be permitted to make any changes to the network access device 202. Accordingly, immediately after the user first claims the network access device 202, all changes must happen though the network-accessible server system 204. If an unauthorized entity were able to compromise the online certificate, the online certificate can be easily changed since it is managed by the network-accessible server system 204. For example, the online certificate could be readily walked back, or replaced with a new online certificate.

In some embodiments, a satellite device 216 may be brought online. The satellite device 216 is proximate to the network access device 202 and installed on the same Wi-Fi network. An electronic device may communicably connect to the Wi-Fi network via the satellite device 216 or the network access device 202. An arrangement of satellite devices (not shown) including the satellite device 216 can improve the existing capabilities of the network access device 202 by, for example, extending the range or improving the signal strength of the Wi-Fi network.

In the illustrated example, the satellite device 216 and network access device 202 are similar devices that are configured for different roles in the same Wi-Fi network. Specifically, both devices can provide network access for electronic devices on the local Wi-Fi network; however, all traffic to/from another network must pass through the network access device 202 (e.g., an edge device) because the satellite device is not directly connected to the other network. Thus, for example, the satellite device 216 cannot receive network connectivity from the Internet on its own. Instead, a communication of an electronic device that is destined for the Internet will pass through one or more satellite devices via the network access device 202, which is directly communicatively coupled to the Internet.

In some embodiments, the satellite device 216 can communicate with the mobile application 210 running on the user device 212. Moreover, because the mobile application 210 on the user device 212 has communicated with the network-accessible server system 204, the network-accessible server system 204 has access to the relevant certificate information and can permit the satellite device 216 to associate with the network access device 202 and/or the mobile application on the user device 212.

In some embodiments, security communications can be pushed directly from the network access device 202 to the satellite device 216. Thus, the network access device 202 can ensure that a secure configuration is deployed once the satellite device 216 has been initiated. After the satellite device 216 acquires network connectivity through network access device 202 of the same Wi-Fi network or through the user device 212, it can register itself with the network-accessible server system 204. Such an arrangement allows the network access device 202 and any number of satellite devices to be connected to the network-accessible server system 204, as well as the mobile application on the user device 212 regardless of whether the corresponding user device 212 resides within the Wi-Fi network of the network access device 202.

If the user device 212 has access to a network outside of the home network (e.g., a cellular network), changes requested through the mobile application 210 can be carried out by the network-accessible server system 204. In some embodiments, any satellite devices on the home network are connected to the network access device 202 in accordance with a hub-and-spoke approach (i.e., each satellite device is connected directly to a network access device). In some embodiments, the network access devices of a home network have a tree network topology where satellite devices are directed connected to each other and the network access device 202 in a hierarchical manner and without forming any communications loops. Thus, each satellite device need not necessarily be directly connected to the network access device 202. For example, a first satellite device could be connected to a second satellite device, which could be connected to the network access device, which is connected to another network. In some embodiments, however, the network topology could have other configurations such as a mesh topology.

By installing a separate online certificate on the network access device 202, the mobile application 210 of the user device 212, and the satellite device 216, the network-accessible server system 204 can ensure that these devices are communicatively coupled together. Consequently, for an unauthorized entity to gain access to the home network, the unauthorized entity would need to acquire the online certificate in addition to the credentials (e.g., username and password) used to log into the mobile application or other secure portal.

A specialized public key infrastructure (PKI) accessible to the network-accessible server system 204 can be configured to facilitate the distribution of online certificates, each of which may include a public encryption key, to the network access device(s), mobile application(s), and/or satellite device(s) associated with a local network. The network-accessible server system may communicate with the PKI via application programming interfaces (APIs), bulk data interfaces, etc. Generally, the network-accessible server system 204 will request a separate certificate for each mobile application and satellite device, For example, if the network access device is setup to be connected to a single mobile application and four satellite devices distributed throughout an environment (e.g., a home), then the network-accessible server system 204 may request five certificates and distribute a unique certificate to the mobile application and satellite devices.

In the tree network topology, the security risk can be beneficially lessened even if the network access device 202 and the satellite device 216 are produced by different entities. For example, an individual may have a router manufactured by COMCAST and an ORBI Wi-Fi System manufactured by NETGEAR deployed on a home network. In such instances, the individual can log into a mobile application 210 executing on the user device 212, claim the network access device 202, and configure each satellite device 216. In some embodiments, the network access device 202 is configured to communicate with the satellite device 216. In such embodiments, traffic received at either level (e.g., by the network access device 202 or the satellite device 216) can be examined for threats. In other embodiments, the satellite device 216 operates independent from the network access device 202. In such embodiments, only traffic received by the satellite device 216 may be examined for threats.

Each time a new electronic device comes onto the home network, the satellite device 216 or the network access device 202 to which it connects can transmit a notification to the mobile application on the user device 212. The notification may prompt the user to specify whether network access should be permitted to that electronic device. While this type of multi-factor approval process requires an express indication of approval from a network administrator (e.g., the user responsible for deploying the network access device and/or satellite device), it can significantly lessen the security risk of unauthorized access. Administrator authorization may be required even if the party attempting to access the local network has acquired the necessary credentials (e.g., the password).

Generally, each network access device and/or satellite device within a network environment will be configured to automatically update its firmware. When these devices are properly connected (e.g., in a tree configuration), the firmware across all of the devices will be consistent. Such action ensures that a hacker cannot gain unauthorized access via a security flaw in an older firmware version that has not yet been manually updated by the network administrator.

To enable a secure boot, these devices can facilitate the creation of a tree network. Initially, birth certificates are generated for each device (i.e., hardware devices including network access devices and satellite devices). These birth certificates can be "sewn" or "burned" into a hardware device during the manufacturing process. Additionally, or alternatively, intermediate certificates can be generated for firmware verification. For example, each instance of firmware can be digitally signed using one of the intermediate certificates before being uploaded/programmed into a hardware device.

In some embodiments, a hash key is programmed in one-time programmable (OTP) memory of the hardware device. This can be done by the manufacturer (e.g., as part of a quality control procedure). Thereafter, the signed firmware can be programmed/uploaded to the hardware device. Thus, when the hardware device leaves the manufacturing facility, it can include a birth certificate and firmware signed with an intermediate certificate.

In some embodiments, the network access device includes a rule set that governs the access of each electronic device. The rule set may allow the series of electronic devices to be batched into several different groups. Examples of these groups include "All Access" where all content is allowed, "Child Access" where some content may be filtered entirely, while other content may be restricted in volume, and "Appliance Access" where limited content may be permitted.

As noted above, when an electronic device (e.g., satellite device 216) attempts to communicatively couple to a local network, the cloud system 206 may prompt a network administrator to specify whether the electronic device should be granted network access. For example, a notification may be presented on the user device 212 associated with the network administrator (e.g., first user 208). In some embodiments, the notification also prompts the first user 208 to categorize the electronic device by, for example, specifying what limitations, if any, should be instituted to restrict network access.

The first user 208 may also be able to alter other preferences via the mobile application 210 on the user device 212. For example, the first user 208 may establish a guest network for a certain period (e.g., a day, week, or an indefinite period). As another example, the network administrator may specify that electronic devices should be permitted to access the guest network in an unimpeded manner (e.g., the network administrator may not receive a separate prompt each time a new electronic device accesses the guest network). These modifications may also be established for a predetermined period (e.g., two hours, four hours, eight hours).

In some embodiments, the network access device 202 is configured to install a tag on each electronic device that connects to the local network. The tag can remain on an electronic device regardless of whether it is still connected to the local network. For example, the network access device 202 may install a tag on a smartphone that requests access to the local network. Thereafter, the smartphone may travel to a different geographical location. For example, the smartphone may travel to another country where it connected to another network. When connected to this other network, malware is installed on the smartphone. Thereafter, the smartphone returns to its original geographic location and connects to the local network. Because traffic entering/exiting the smartphone travels through the network access device 202, the network access device 202 can examine features indicative of communication usage, patterns, etc. For example, the network access device may monitor central processing unit (CPU) patterns, memory patterns, or power consumption.

Data related to these features can be transmitted to the cloud system 206. Accordingly, the cloud system 206 may generate a profile for each electronic device that specifies expected/average feature values. Upon discovering a feature value exceeding a certain threshold (e.g., 150% of the average feature value), the cloud system 206 may alert the first user 208. In some embodiments the cloud system 206 monitors the data to detect single instances of unexpected feature values, while in other embodiments the cloud system monitors the data to detect multiple instances of unexpected feature values. For example, the cloud system may not notify the network administrator that a particular electronic device is generating more traffic than usual unless such activity is observed over the course of a day or week.

Different actions can then be taken if abnormal feature values are discovered. For example, the cloud system 206 may prompt the network administrator to specify whether a potentially infected electronic device should be prevented from accessing the network via the network access device or monitored more closely. Similarly, the network administrator may opt to run/install malware protection since the cloud system 206 has discovered a possible unauthorized access.

Each profile can be stored in the network access device 202, the cloud system 206, or any combination thereof. In some embodiments, a similar profile is generated for the network access device 202. Accordingly, feature(s) indicative of usage may be monitored for the network access device 202 and/or each electronic device. In some embodiments, the cloud system 206 applies a machine learning engine to discover patterns in the feature(s) and learn how to alert the first user 208 in a more useful manner. For example, rather than completely restrict network access, the cloud system 206 may recommend that the first user 208 consider whether an electronic device has experienced increased usage over historical norms.

As noted above, if abnormal feature value(s) are discovered for an electronic device, the first user 208 may opt to automatically restrict network access by the electronic device. Such a feature may be referred to as a "kill switch." Whether network access is restricted may be based on a comparison of the feature value(s) associated with an electronic device with a single profile or multiple profiles. The single profile may correspond to a historical pattern of feature value(s) of the electronic device, while the multiple profiles may correspond to historical patterns of feature value(s) of all electronic devices connected to the cloud system, all electronic devices having a characteristic in common, etc. Thus, if a large number (e.g., thousands or millions) of network access devices have been deployed, the cloud system may employ machine learning operations to discover patterns indicative of unauthorized access.

In some embodiments, the network access device 202 includes computer programs (also referred to as "applications" or "tools") designed to identify and/or eliminate security risks to a local network. For example, the network access device 202 may include a deep packet inspection (DPI) application configured to locate, identify, classify, reroute, and/or block data packets with certain data. As another example, the network access device 202 may include a specialized encryption/decryption application, malware detection application, or anti-virus application.

For traditional network access devices, verification was a straightforward process. Once a traditional network access device was purchased, the software installed on that device generally remained the same. While some traditional network access devices permitted users to manually update the software, each device was handled separately. Therefore, to update a pool of network access devices (e.g., all devices owned by an enterprise), each device would undergo a dedicated, time-consuming verification process.

However, the secure boot mechanisms described herein enable software updates to be concurrently distributed amongst an entire pool of network access devices. Such a feature is particularly useful to certain types of network access devices (e.g., the ORBI Wi-Fi System manufactured by NETGEAR). For example, a network-connected computer server may push an update out to an entire tree network fabric of network access devices to ensure that all of the network access device remain in sync, thereby preventing an unauthorized entity from pushing potentially malicious software to the network access devices.

Reclamation and Registration

In some instances, a network administrator may choose to return a registered network access device to a merchant or manufacturer for any of a variety of reasons. However, the registered network access device cannot be used by a new owner without further action. For example, if the second user 218 (e.g., prospective owner) attempts to claim the network access device 202, the second user 218 may receive a notification specifying that customer support should be contacted. For example, the second user 218 may download the mobile application 210 for execution on a user device 222 in a manner like the user device 212 of the first user 208, which can display the notification specifying that the second user 218 should contact customer support. To facilitate the transfer ownership, the network access device 202 includes a hardware reset button 220. Actuating the reset button 220 can reset a configuration including local settings of the network access device 202. However, if registered, the network access device 202 cannot be reclaimed until it has been fully reset by, for example, the manufacturer.

This can occur in several different ways. For example, a merchant may send the returned network access device back to the manufacturer (e.g., NETGEAR) to be reset in accordance with a return merchandise authorization (RMA) process. An RMA station apparatus allows the returned network access device to be reset before being re-soled to a new owner. For example, when the returned network access device is coupled to the RMA station, the RMA station can check to see whether the returned network access device has the latest firmware. During installation of firmware, the RMA station may shutdown all ports of the returned network access device for security purposes. The RMA station can then enable a specific port. Generally, the RMA station includes a license key or a certificate that enables it to communicate with a cloud system associated with the manufacturer.

The RMA station can transmit a notification to the cloud system indicating that it is connected to a returned network access device that is to be debugged. After the cloud system has verified the authenticity of the RMA station (e.g., by examining the license key or the certificate), the cloud system may open a communication channel with the returned network access device via the specific port.

In some embodiments, the cloud system is configured to upload debug firmware to the returned network access device via the communication channel. Such action may automatically occur upon establishing the communication channel, receiving a request for the debug firmware from the returned network access device, etc. The debug firmware may only be available on a certain network (e.g., a network associated with the manufacturer). Moreover, the debug firmware may be loaded into read-only memory (ROM) so that when the returned network access device is rebooted, the debug firmware will be replaced by the regular firmware that is loaded from random access memory (RAM). Such a process ensures that the regular firmware will be loaded regardless of whether the returned network access device is properly rebooted while connected to the RMA station or removed from the RMA station prior to rebooting.

Secure Transfer of Ownership of Network Access Devices

In some instances, a user and owner of a network access device (e.g., a network administrator of the first network) may choose to transfer ownership and/or control of the network access device to a new owner (e.g., the second network). In some instances, a malicious actor may attempt to take the network access device 202 and use it without authorization of the owner. In either instance, the network access device should be reset before it can be used by the new owner or malicious actor. Hence, network access devices are vulnerable to misuse because a secure process for end users to flexibly restrict the transfer of ownership and/or control of a network access device did not previously exist.

Figure 3:
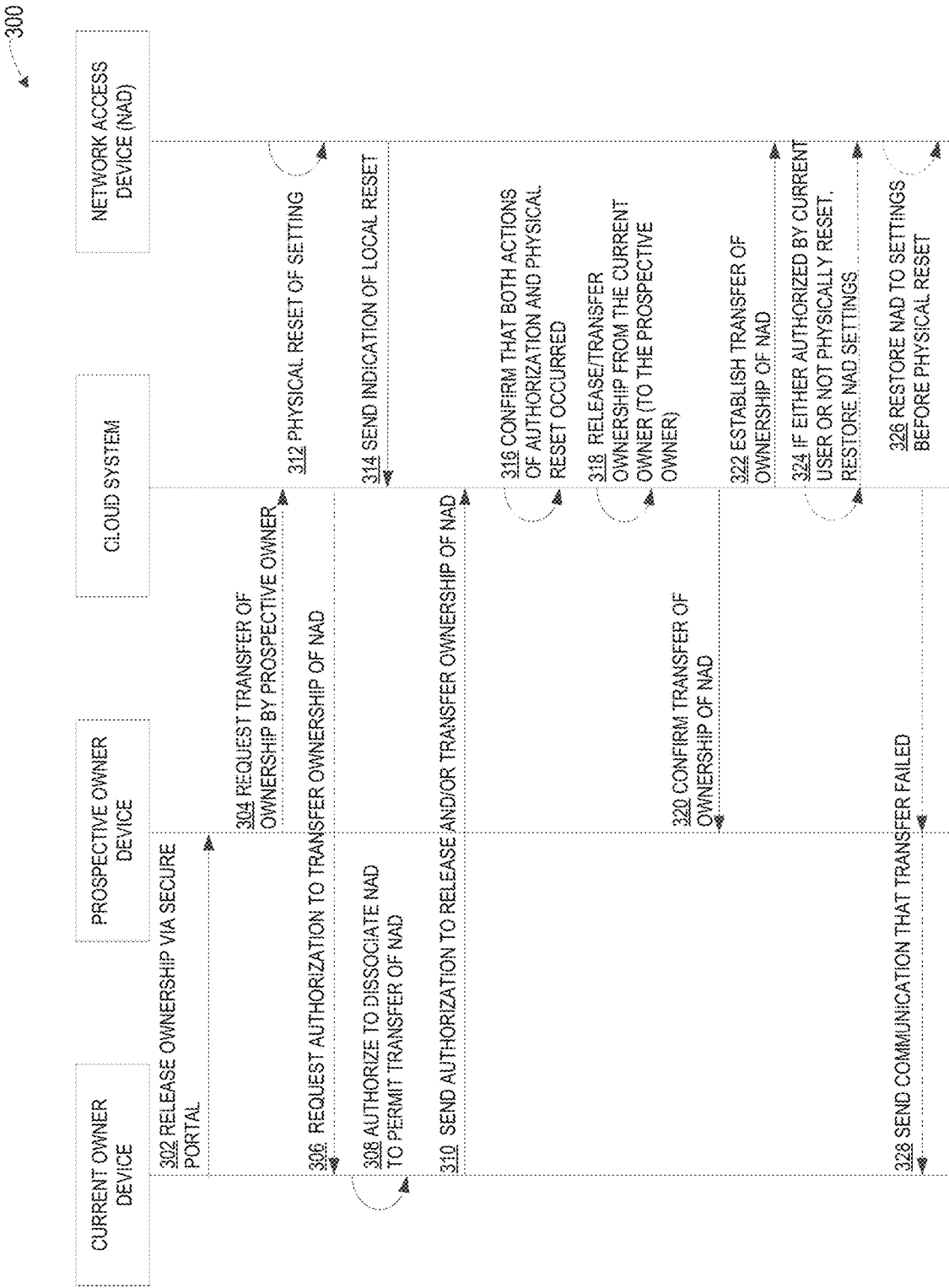
FIG. 3 is a flowchart that illustrates a process for securely transferring ownership of a registered network access device according to some embodiments of the present disclosure.

The disclosed embodiments include techniques for securely transferring ownership of a network access device from one user to another user. FIG. 3 is a flowchart that illustrates a process for securely transferring ownership of a registered network access device according to some embodiments of the present disclosure. The process 300 is performed by a cloud system to change a registration of a network access device (e.g., a router, a switch, a modem, an access point). The change in the registration of a network access device can be initiated in a variety of ways. As previously noted, a cloud system may associate the network access device with an owner's account to establish ownership. That is, the registration stored at a cloud system indicates the ownership of the network access device by the current owner. For a prospective owner to claim the network access device, the current owner needs to release ownership of the network access device.

In one example, the current owner may initiate release of the network access device by accessing a secure portal over a network, logging into the owner's account, and then opting to dissociate the network access device from the account. For example, in step 302, the current owner opens a secure portal to access the current owner's account. The cloud system receives login credentials input by the current owner to access the registration information of the network access device. Hence, the cloud system receives authorization from the current owner to dissociate the ownership of the network access device that is registered with the account.

In another example, the prospective owner may initiate the release of the network access device by requesting a transfer from the cloud system. For example, in step 304, the prospective owner may send a request to change the registration information to establish new ownership of the network access device by the prospective owner. The request to transfer may be input to the secure portal without needing credentials by the prospective owner. In step 306, the cloud system responds to the request from the prospective owner by requesting authorization from the current owner to allow the change in ownership.

In step 308, the current owner authorizes the cloud system to dissociate its ownership over the network access device so that the ownership can be transferred to the prospective owner, which would then be registered at the cloud system as the new owner of the network access device.

In step 310, the authorization to release ownership in accordance with step 302 or the authorization to transfer ownership in response to the request of step 304 is sent to the cloud system. To ensure that the network access device has only one owner at any point in time, and to mitigate the behavior of malicious actors, the transfer of ownership of the network access device between any two users may require both authorization by a current owner and require physically resetting the network access device.

In step 312, a hardware reset actuator (e.g., button, switch) on the network access device is actuated. The current owner, the prospective owner, or anyone else that can interact with a physical button can reset the network access device to factory settings. Therefore, unlike the explicit authorization from the current owner, the physical reset of the network access device is an unsecure, unrestricted, and user-agnostic action.

In step 314, the network access device sends a communication over a network to the cloud system to indicate that the network access device has been physically reset locally. Hence, receiving an indication that the physical reset occurred locally at the network access device, allows the cloud system to dissociate the current ownership of the network access device.

In step 316, the cloud system confirms the authorization by the current owner and the physical reset of the network access device. For example, the current owner's account may store information (e.g., credentials, signatures) of the current owner and the network access device that can be used to confirm that the received authorization and indication of the physical reset are valid. If so, release or transfer of ownership is allowed. Therefore, in some embodiments, to completely dissociate the network access device from the current owner, both of these actions (i.e., express authorization and physical reset) must be performed.

In step 318, the release (or transfer) of ownership from the current owner (to the prospective owner) is performed if both the authorization and physical reset are confirmed, and the cloud system releases the ownership by the current owner of the network access device and records the new ownership by the prospective owner. Specifically, the transfer of ownership of the network access device is registered at the cloud system if a transfer was requested for a prospective owner, the release of ownership was authorized by the current user, and the network access device was physically reset. In optional step 320, the cloud system sends a notification of the change in registration to the prospective user (i.e., the new owner).

In step 322, the cloud system establishes the new ownership at the network access device by sending a communication to reconfigure the network access device. The electronic communication causes the network access device to reflect that the prospective owner is the new current owner.

In step 324, if either the authorization from the current owner or the indication of the physically reset are not received by the cloud system, the release or transfer of ownership is not allowed. In another example, if the cloud system receives the authorization and indication of the physical reset but determines that at least one of those actions is invalid, the release or transfer of ownership is not allowed.

If the release or transfer was not allowed, the cloud system and the network access device can undergo a restoration process. For example, the registration of the network access device at the cloud system can be restored. In step 326, the cloud system causes the network access device to restore a setting or configuration of the network access device to a setting or configuration at a point in time before occurrence of the physical reset.

In step 328, the cloud system sends a communication to at least one of a user device of the current owner or a user device of the prospective owner. The communication indicates that transfer of ownership of the network access device from the current owner to the prospective owner failed.

Secure Transfer of Control to Manage Network Access Devices

The disclosed embodiments include techniques for securely transferring exclusive control to manage a network access device from a first user device (e.g., smartphone) to a second user device (e.g., tablet computer). In some embodiments, only one user device can control the network access device at any point in time. Hence, exclusive control to manage the network transfer device is transferred between these user devices. The exclusive control is enabled by at either user device by a computer program (e.g., mobile application) installed on each user device as associated certificate, signature, key, etc.

Figure 4:
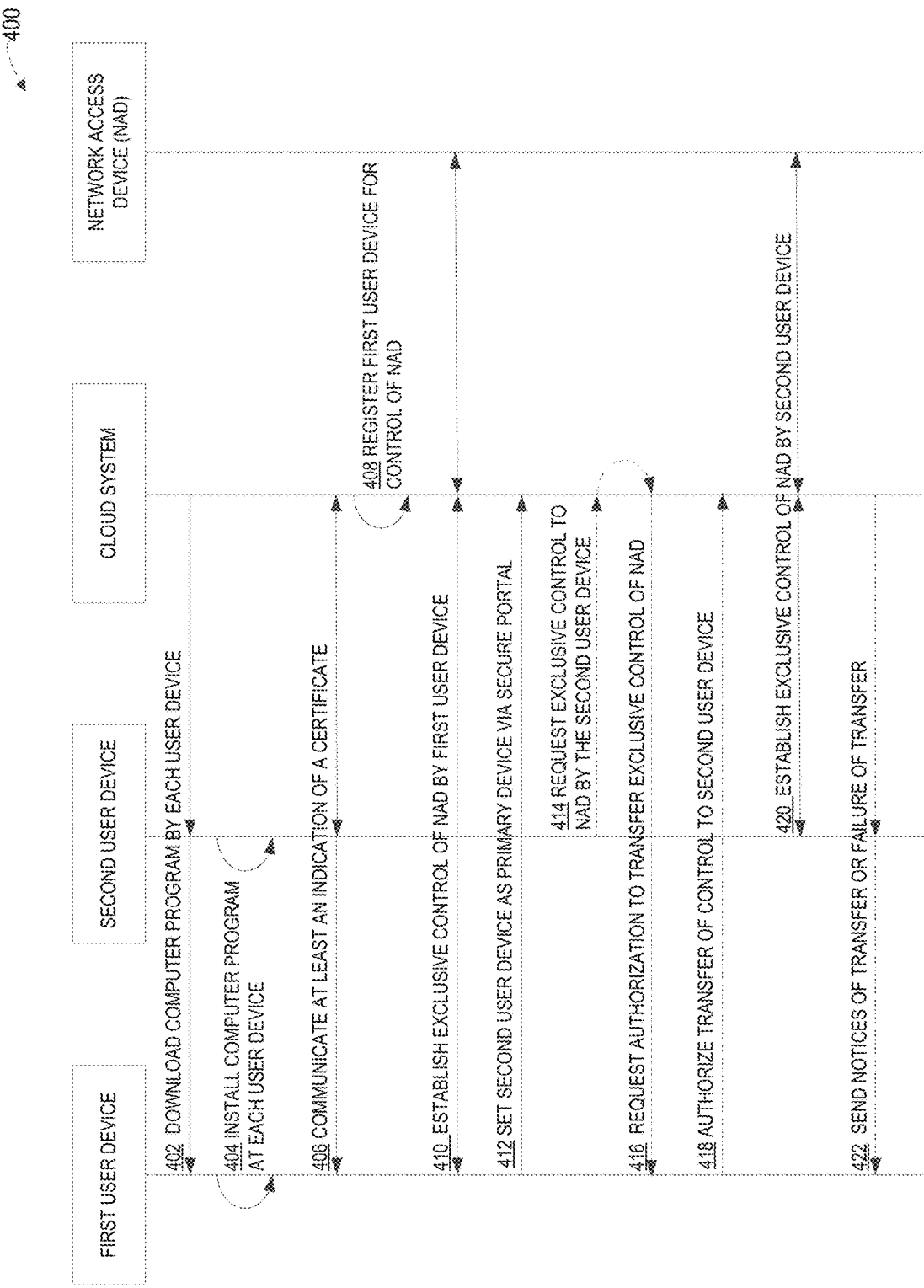
FIG. 4 is a flowchart that illustrates a process for securely transferring management control of a network access device according to some embodiments of the present disclosure.

FIG. 4 is a flowchart that illustrates a process for securely transferring control to manage a network access device according to some embodiments of the present disclosure. In step 402, each user device downloads the mobile application. For example, a network administrator may download a mobile application on the smartphone and the tablet computer. In step 404, the mobile application is installed on the two user devices at the same time or at different times. For example, the mobile application may be downloaded and installed on the second user device to transfer control from the first user device to the second user device long after the first user device has been exercising its control over the network access device.

In step 406, each user device can communicate an indication of a certificate stored locally at each user device or receive a certificate from the cloud system. The certificate authorizes a user device to communicate with the cloud system and the network access device. The indications or certificate may be communicated at different times or the same time. In step 408, the cloud system registers the first user device to control the management of the network access device. As such, the first user device is the only user device that can manage the network access device.

In step 410, the cloud system establishes exclusive control of the network access device by the first user device. The cloud system sends a communication to the network access device authorizing the release of exclusive control by the first user device. As such, exclusive control to manage the network access device is established among the cloud system, the first network access device, and the first user device.

The network administrator may later choose to instead manage the network access device with a tablet computer (e.g., a second user device). In such instances, the certified mobile application stored at the tablet computer can securely request control to manage the network access device. Such action may require the smartphone and the tablet computer to each associate with a certificate that permits communication with a cloud system.

In some embodiments, the mobile application can permit a user to manually designate the first user device or the second user device as a primary user device that has exclusive control to manage the network access device. For example, the owner of the user device that currently controls the management of the network access device can initiate the transfer of control to another user device. For example, in step 412, the network administrator may log into a mobile application on the smartphone and select the tablet computer as the primary management source. In another example, in step 414, the network administrator may log into the mobile application on the tablet computer and specify that the tablet computer should be the primary source, in which case a notification is transmitted to the smartphone that prompts the network administrator to confirm the change at the smartphone in step 416.

In some embodiments, any user of any user device can initiate a transfer of control to another user device. For example, in step 414, the cloud system receives a communication indicating that a second user device seeks exclusive control to manage the network access device. The communication may indicate that the second user device has or seeks a certificate to grant that user device exclusive control to manage the network access device. As such, any user of the second device can request to change the exclusive control over the network access device from the first user device to the second user device.

In step 416, the cloud system requests authorization by the user device that currently has exclusive control to manage the network access device, to transfer that control. Specifically, the cloud system sends a request to the first user device seeking authorization to change the exclusive control to manage the network access device from the first user device to the second user device. The change of exclusive control is only granted after authorization is confirmed by the user device that currently has exclusive control (e.g., the first user device).

In step 418, the first user device sends an authorization to the cloud system. The authorization allows changing the exclusive control to manage the network access device. Further, the authorization cause release of the exclusive control by the user device such that the first user device is thereafter unauthorized to manage the network access device.

In step 420, the cloud system grants exclusive control to manage the network access device to the second user device. The cloud system also sends, to the network access device, a communication indicating that the second user device has exclusive control to manage the network access device.

In some embodiments, the cloud system sends a communication to the network access device indicating the release of exclusive control by the first user device. The communication causes the network access device to release exclusive control by the first user device or transfers exclusive control to manage the network access device to the second user device. That is, the cloud system sends, to the network access device, a communication indicating that the second user device has exclusive control to manage the network access device, and the network access device is reconfigured for control by the second user device.

In some embodiments, a user device is enabled to manage the wireless network device over a short-range wireless connection (e.g., BLUETOOTH). In some embodiments, the user device is enabled to manage the wireless network device over a local area network (e.g., Wi-Fi network).

In step 422, the could system optionally sends a notice to at least one of the first user device about the success of the transfer or the failure to do so.

Secure Transfer of Configurations of Network Access Devices

Figure 5:
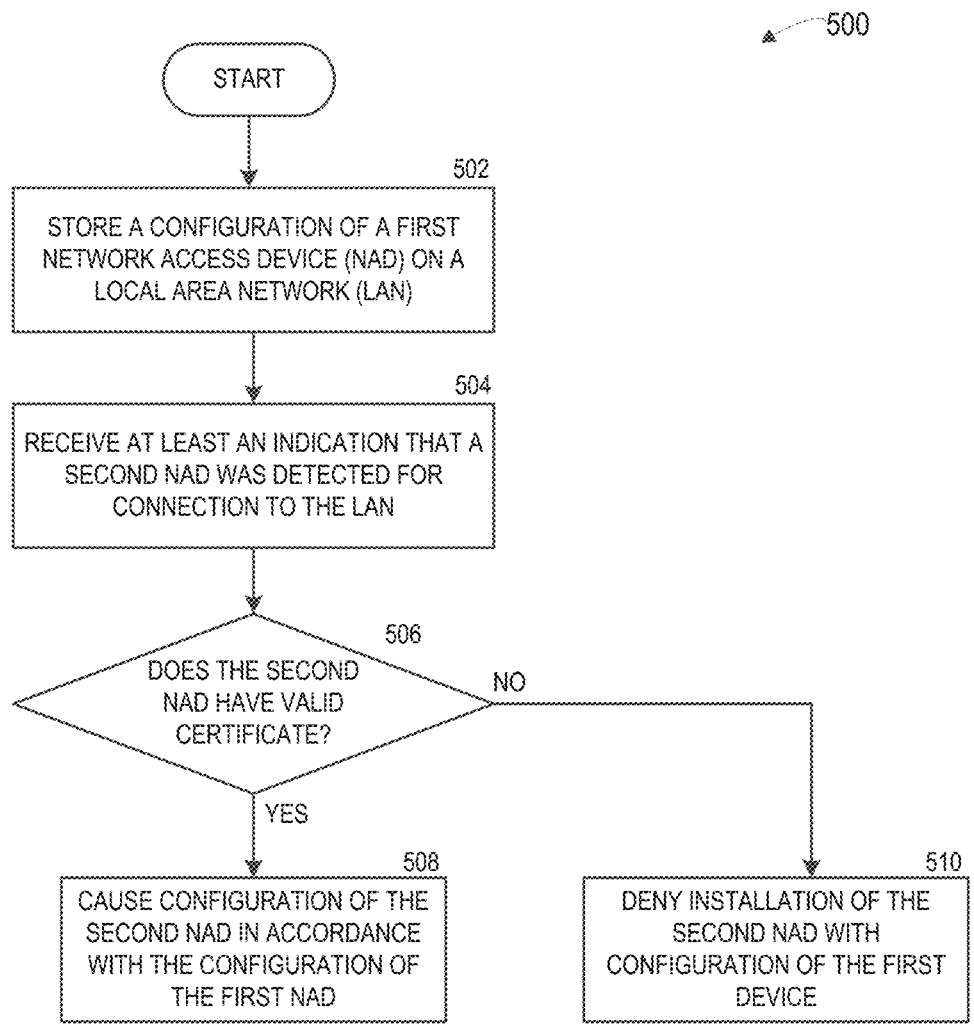
FIG. 5 is a flowchart that illustrates a process for securely transferring a configuration of one network access device to another network access device according to some embodiments of the present disclosure.

FIG. 5 is a flowchart that illustrates a process for securely transferring a configuration of one network access device to another network access device according to some embodiments of the present disclosure.

In step 502, one or more configurations of the network access device configured for a network are stored in a storage device of the cloud system. That is, a network access device has a configuration that may be stored by the cloud system (along with other configurations) on behalf of the current owner or the prospective owner. By storing one or more configurations at a storage device that is remote from the network access device, an owner can readily restore any stored settings if, for example, a reset button is mistakenly triggered or triggered by a malicious actor. These configurations may also permit an owner to transfer settings from one network access device to another network access device.

In step 504, the cloud system receives an electronic communication indicating that a second network access device (e.g., satellite device) seeks to join a local area network that includes the network access device. For example, the electronic communication may indicate that the second network access device stores a certificate locally which allows the second network access device to communicate with the original network access device.

In step 506, the cloud system determines whether the second network access device has a valid certificate that allows transfer of the configuration information. If the cloud system determines that the second network access device has a valid local certificate, the cloud system sends information about the configuration of the original network access device to the second network access device. This causes the second network access device to adopt the configuration of the original network access device. As such, the second network access device can clone a part of or the entire configuration of original network access device or a part of thereof.

In step 510, the second network access device is not allowed to adopt the configuration of the original network access device. This may occur if the certificate of the second network device is determined in valid in step 506.

Processing System

Figure 6:
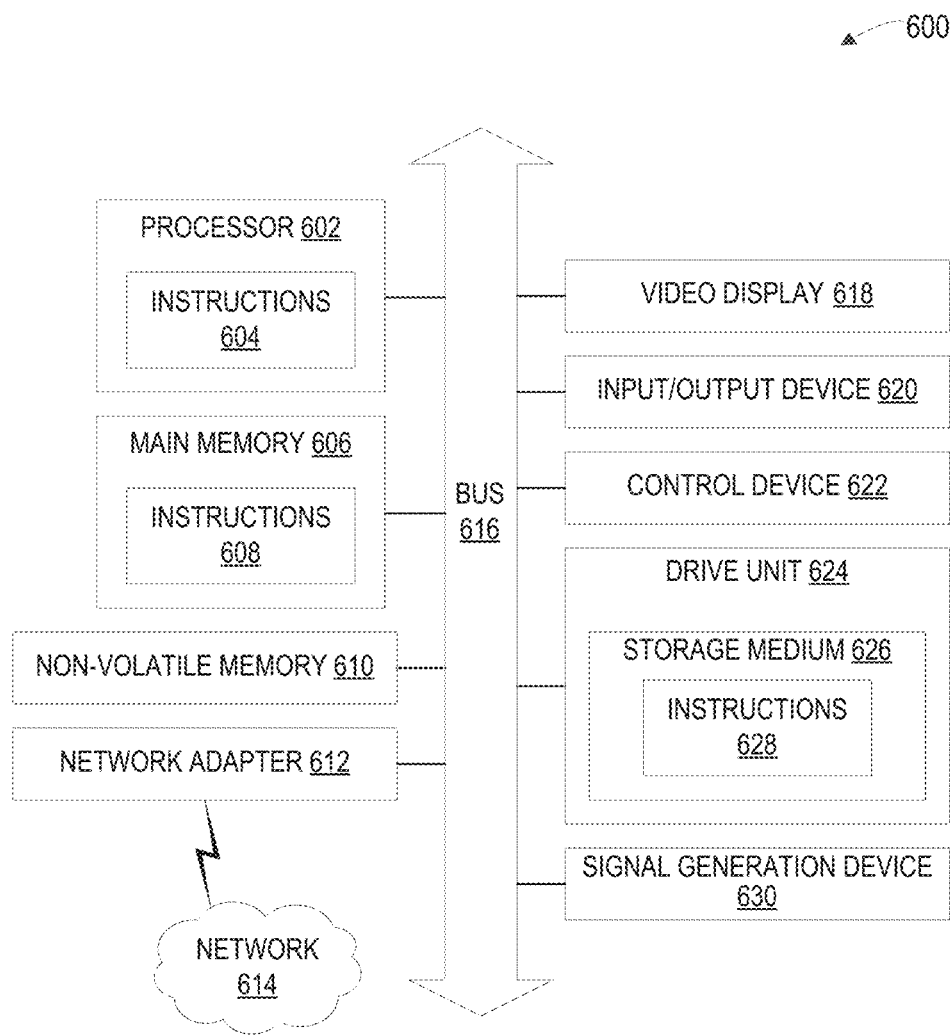
FIG. 6 is a block diagram that illustrates an example of a processing system in which at least some operations described herein can be implemented.

FIG. 6 is a block diagram illustrating an example of a processing system 600 in which at least some operations described herein can be implemented. For example, some components of the processing system 600 may be hosted on a network access device (e.g., network access device 202), a satellite device (e.g., the satellite device 216), a network-accessible server system (e.g., the cloud system 206), or an electronic device on which a mobile application resides (e.g., the user device 212).

The processing system 600 may include one or more central processing units ("processors") 602, main memory 606, non-volatile memory 610, network adapter 612 (e.g., network interface), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., "Firewire").

The processing system 600 may share a similar computer processor architecture as that of a desktop computer, tablet computer, personal digital assistant (PDA), smartphone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in a computing device. When read and executed by the one or more processors 602, the instruction(s) cause the processing system 600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 610, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 612 enables the processing system 600 to mediate data in a network 614 with an entity that is external to the processing system 600 through any communication protocol supported by the processing system 600 and the external entity. The network adapter 612 can include a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 612 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a cloud system for transferring exclusive control for a user to manage a network access device, the method comprising:
   receiving a request from a second user device to transfer exclusive control to manage a network access device from a first user device to the second user device;
   sending, to the first user device, a communication requesting authorization to dissociate exclusive control to manage the network access device by the first user device;
   granting, to the second user device, exclusive control to manage the network access device, wherein the network access device is restricted to being managed by only one user device at any point in time; and
   sending, to the network access device, a communication indicating that the exclusive control by the first user device is released and causing configuration of the network access device to restrict exclusive control to the second user device.

2. The method of claim 1 further comprising:
   transferring ownership of the network access device from a first user of the first user device to a second user of the second user device; and
   registering ownership to the second user at the cloud system.

3. The method of claim 1, wherein transferring ownership of the network access device between any two users requires both an authorization by a prior owner and physically resetting the network access device.

4. The method of claim 1, further comprising:
   receiving login credentials of a first user of the first user device to access an account that belongs to the first user and includes a registration of the network access device; and
   receiving the authorization from the first user to dissociate ownership of the network access device as registered in the account.

5. The method of claim 1 further comprising:
   sending a notification of a change in a registration of the network access device to reflect the second user.

6. The method of claim 1, further comprising, prior to granting exclusive access to the second user device:
   receiving an indication of a physical reset of the network access device.

7. The method of claim 6 further comprising:
   determining that at least one of the authorization or the indication of the physical reset is invalid; and
   causing the network access device to restore a current setting or a current configuration of the network access device to a prior setting or a prior configuration captured a point in time before occurrence of the physical reset.

8. The method of claim 7 further comprising:
   restoring registration of the network access device at the cloud system.

9. The method of claim 6, wherein the physical reset of the network access device is an unsecured, unrestricted, and user-agnostic function.

10. The method of claim 6, wherein the physical reset includes actuation of a hardware actuator on the network access device.

11. The method of claim 1, wherein the network access device is any of a router, a switch, a modem, or an access point.

12. The method of claim 1 further comprising, prior to granting exclusive control to the second user device:
    receiving a communication indicating that the second user device has a certificate that permits the second user device to have exclusive control to manage the network access device.

13. The method of claim 1, wherein the first user device is a smartphone and the exclusive control is effected by a mobile application installed on the smartphone.

14. The method of claim 1, wherein the second user device is effected to manage the network access device over a local area network.

15. The method of claim 1, wherein the second user device is enabled to manage the network access device over short-range wireless connection.

16. The method of claim 1 further comprising:
    receiving a request to change the exclusive control to manage the network access device;
    releasing the exclusive control by the second user device such that the second user device is incapable of managing the network access device; and
    sending, to the network access device, a communication indicating the release of exclusive control by the second user device, the communication causing the network access device to release the exclusive control by the second user device.

17. The method of claim 1, wherein the first user device and the second user device both belong to a common user.

18. The method of claim 1, wherein the first user device belongs to a first user and the second user device belongs to a second user different from the first user.

19. The method of claim 1, wherein a mobile application on the first user device permits a user to manually designate the first user device or the second user device as a primary user device that has exclusive control to manage the network access device.

20. The method of claim 1, wherein the network access device is a first network access device, and the cloud system stores a configuration of a plurality of setting of the first network access device, the method further comprising:
- receiving a communication indicating that a second network access device is requesting a configuration to join a network that includes the first network access device;
- sending, to the second network access device, information about the configuration of the first network access device; and
- causing the second network access device to adopt at least a portion of the configuration of the first network access device.

21. At least one computer-readable storage medium, excluding transitory signals and carrying instructions, which, when executed by at least one processor, cause a system to:
- receive a request from a second user device to transfer exclusive control to manage a network access device from a first user device to the second user device;
- send, to the first user device, a communication requesting authorization to dissociate exclusive control to manage the network access device by the first user device;
- grant, to the second user device, exclusive control to manage the network access device, wherein the network access device is restricted to being managed by only one user device at any point in time; and
- send, to the network access device, a communication indicating that the exclusive control by the first user device is released and causing configuration of the network access device to restrict exclusive control to the second user device.

22. The at least one computer-readable storage medium of claim 21, wherein transferring exclusive control of the network access device to another device requires both authorization by a prior owner and physically resetting the network access device.

23. The at least one computer-readable storage medium of claim 21, wherein the system is further caused to:
- determine that at least one of an authorization or an indication of a physical reset at the network access device is invalid; and
- restore the network access device to a prior setting for exclusive control.

24. A system comprising:
- at least one hardware processor; and
- at least one non-transitory memory storing instructions, which, when executed by the at least one hardware processor, cause the system to:
- receive a request from a second user device to transfer exclusive control to manage a network access device from a first user device to the second user device;
- send, to the first user device, a communication requesting authorization to dissociate exclusive control to manage the network access device by the first user device;
- grant, to the second user device, exclusive control to manage the network access device, wherein the network access device is restricted to being managed by only one user device at any point in time; and
- send, to the network access device, a communication indicating that the exclusive control by the first user device is released and causing configuration of the network access device to restrict exclusive control to the second user device.

25. The system of claim 24, wherein transferring exclusive control of the network access device to another device requires both authorization by a prior owner and physically resetting the network access device.

* * * * *